United States Patent
Takagi et al.

(10) Patent No.: US 10,024,245 B2
(45) Date of Patent: Jul. 17, 2018

(54) CONTROL DEVICE FOR INTERNAL COMBUSTION ENGINE AND METHOD OF CONTROLLING INTERNAL COMBUSTION ENGINE

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Noboru Takagi, Toyota (JP); Yoshinobu Uchiyama, Toyota (JP); Masaaki Kaneko, Nukata-gun (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 94 days.

(21) Appl. No.: 15/351,906

(22) Filed: Nov. 15, 2016

(65) Prior Publication Data
US 2017/0138275 A1 May 18, 2017

(30) Foreign Application Priority Data
Nov. 18, 2015 (JP) ................................. 2015-225599

(51) Int. Cl.
*F01L 1/34* (2006.01)
*F02D 13/02* (2006.01)
(Continued)

(52) U.S. Cl.
CPC .......... *F02D 13/0219* (2013.01); *F01L 1/047* (2013.01); *F01L 1/3442* (2013.01); *F01L 2001/0537* (2013.01); *F01L 2001/3443* (2013.01); *F01L 2001/34426* (2013.01); *F01L 2001/34496* (2013.01); *F01L 2201/00* (2013.01); *F01L 2800/14* (2013.01);
(Continued)

(58) Field of Classification Search
CPC .......... F02D 13/0219; F02D 2200/602; F02D 2200/101; F02D 2200/1002; F01L 1/047; F01L 1/3442; F01L 2201/00; F01L 2800/14; F01L 2001/34426
See application file for complete search history.

(56) References Cited

U.S. PATENT DOCUMENTS 8,457,864 B2 * 6/2013 Takemura ............. F01L 1/3442
123/90.17

FOREIGN PATENT DOCUMENTS

JP 2000-345872 A 12/2000
JP 2008-208741 A 9/2008
(Continued)

Primary Examiner — Zelalem Eshete
(74) Attorney, Agent, or Firm — Oliff PLC (57) ABSTRACT

A control device for an internal combustion engine includes an ECU. The internal combustion engine includes an oil pump, a crankshaft, a camshaft, and a variable valve timing mechanism. The ECU is configured to: calculate a required engine torque, which is an engine torque requested by a driver, based on accelerator operation amount information; calculate a future target phase of the variable valve timing mechanism based on a rotational speed of the internal combustion engine and the required engine torque; calculate an anticipated deviation that is a difference between the future target phase and a current actual phase; and control a discharge amount of oil from the oil pump based on the anticipated deviation.

4 Claims, 8 Drawing Sheets (51) Int. Cl.
*F01L 1/047* (2006.01)
*F01L 1/344* (2006.01)
*F01L 1/053* (2006.01)

(52) U.S. Cl.
CPC ... *F01L 2820/041* (2013.01); *F01L 2820/042* (2013.01); *F02D 2200/101* (2013.01); *F02D 2200/1002* (2013.01); *F02D 2200/602* (2013.01); *Y02T 10/18* (2013.01)

(56) References Cited

FOREIGN PATENT DOCUMENTS

| | | |
|---|---|---|
| JP | 2015-045287 A | 3/2015 |
| JP | 2015-045288 A | 3/2015 |

\* cited by examiner

CONTROL DEVICE FOR INTERNAL COMBUSTION ENGINE AND METHOD OF CONTROLLING INTERNAL COMBUSTION ENGINE

INCORPORATION BY REFERENCE

The disclosure of Japanese Patent Application No. 2015-225599 filed on Nov. 18, 2015 including the specification, drawings and abstract is incorporated herein by reference in its entirety.

BACKGROUND

1. Technical Field

The disclosure relates to a control device for an internal combustion engine, and relates also to a method of controlling an internal combustion engine.

2. Description of Related Art

Japanese Patent Application Publication No. 2015-45287 (JP 2015-45287 A) describes an internal combustion engine mounted in a vehicle and provided with an oil pump configured to vary a discharge amount of oil, and variable valve timing mechanisms operated by the oil supplied from the oil pump.

In such an internal combustion engine, the power that the oil pump receives from an output shaft of the internal combustion engine is required to be kept at the minimum necessary in order to enhance the fuel efficiency. That is, a discharge amount of oil from the oil pump is required to be decreased. On the other hand, it is necessary to ensure the high responsiveness of operation of the variable valve timing mechanisms that operate using the hydraulic fluid supplied from the oil pump as a power source.

In view of this, a control device for an internal combustion engine in JP 2015-45287 A is configured to calculate a consumption flow rate during the operation of each variable valve timing mechanism based on the difference between a target phase and an actual phase of the variable valve timing mechanism, and correct a discharge amount of oil from the oil pump so as to increase the discharge amount based on the consumption flow rate (to increase a target hydraulic pressure). Thus, the high responsiveness of the operations of the variable valve timing mechanisms is ensured while the fuel efficiency is enhanced.

SUMMARY

With the control device for an internal combustion engine described above, the target hydraulic pressure is increased at the timing at which the operation of each variable valve timing mechanism starts, but the timing at which the target hydraulic pressure starts rising may be delayed. As a result, it may be difficult to ensure the sufficient responsiveness immediately after the operation of each variable valve timing mechanism is started.

The disclosure provides a control device for an internal combustion engine and a method of controlling an internal combustion engine, the control device and the method making it possible to improve the responsiveness of a variable valve timing mechanism while enhancing the fuel efficiency.

A first aspect of the present disclosure provides a control device for an internal combustion engine. The internal combustion engine includes an oil pump, a crankshaft, a camshaft, and a variable valve timing mechanism. The oil pump is configured to vary a discharge amount of oil. The variable valve timing mechanism is configured to vary a phase of the camshaft relative to the crankshaft using the oil supplied from the oil pump, such that a valve timing is varied. The control device includes an electronic control unit. The electronic control unit is configured to: calculate a required engine torque based on accelerator operation amount information; calculate a future target phase of the variable valve timing mechanism based on a rotational speed of the internal combustion engine and the required engine torque; calculate an anticipated deviation that is a difference between the future target phase and a current actual phase; and control the discharge amount of oil from the oil pump based on the anticipated deviation.

With the above configuration, a target intake air amount (future load factor) can be calculated based on the required engine torque, and thus the anticipated deviation can be calculated by using the future load factor. The discharge amount of oil is controlled based on the anticipated deviation. Thus, the operation of the variable valve timing mechanism is predicted, and the discharge amount of oil from the oil pump can be increased before the operation of the variable valve timing mechanism is started. Thus, it is possible to ensure the high responsiveness of the operation of the variable valve timing mechanism from immediately after the start of operation thereof. Thus, it is possible to improve the responsiveness of the variable valve timing mechanism while enhancing the fuel efficiency.

In the control device, the electronic control unit may be configured to increase the discharge amount of oil as the anticipated deviation is greater.

With the above configuration, the discharge amount is increased when the anticipated deviation is great, whereas the discharge amount is decreased when the anticipated deviation is small. As a result, it is possible to prevent the discharge amount from increasing more than necessary. Thus, it is possible to enhance the fuel efficiency.

In the control device, the electronic control unit may be configured to: calculate a current target phase based on the rotational speed and a load factor of the internal combustion engine; calculate an actual deviation that is a difference between the current target phase and the current actual phase; and control the discharge amount of oil from the oil pump based on the greater of the anticipated deviation and the actual deviation.

With the above configuration, it is possible to ensure the sufficient discharge amount until the actual phase converges to the current target phase (until the actual deviation becomes zero), even when the anticipated deviation becomes smaller than the actual deviation.

A second aspect of the present disclosure provides a method of controlling an internal combustion engine. The internal combustion engine includes an oil pump, a crankshaft, a camshaft, and a variable valve timing mechanism. The oil pump is configured to vary a discharge amount of oil. The variable valve timing mechanism being configured to vary a phase of the camshaft relative to the crankshaft using the oil supplied from the oil pump, such that a valve timing is varied. The method includes: calculating a required engine torque based on accelerator operation amount information; calculating a future target phase of the variable valve timing mechanism based on a rotational speed of the internal combustion engine and the required engine torque; calculating an anticipated deviation that is a difference between the future target phase and a current actual phase; and controlling the discharge amount of oil from the oil pump based on the anticipated deviation.

With the control device for an internal combustion engine and the method of controlling an internal combustion engine, it is possible to improve the responsiveness of the variable valve timing mechanism while enhancing the fuel efficiency.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an example embodiment will be described with reference to the accompanying drawings. In the present embodiment, the case where the disclosure is applied to an electronic control unit (ECU) 100 configured to control an engine 1 mounted in a vehicle will be described.

Figure 1:
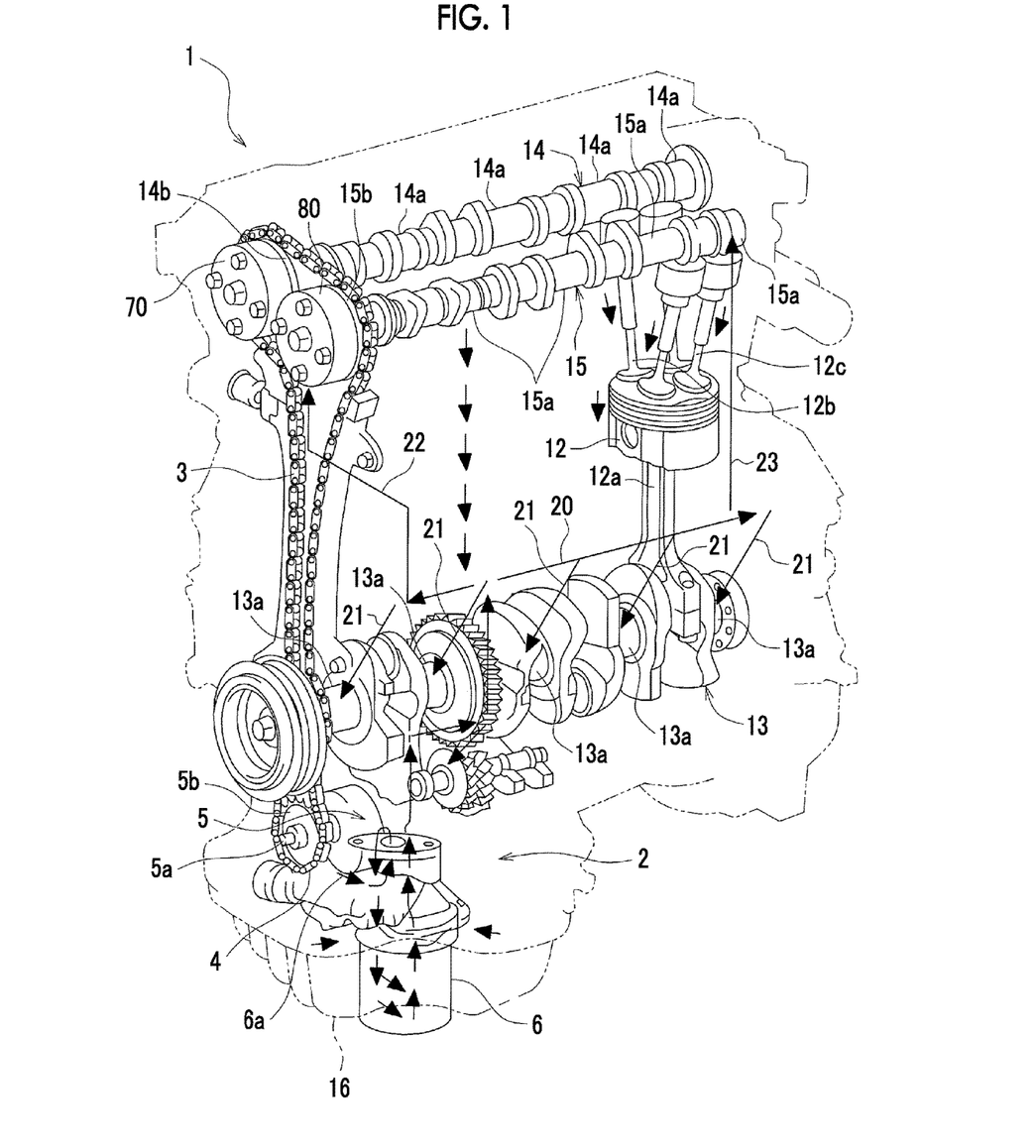
FIG. 1 is a schematic configuration view illustrating an example of an engine that is controlled by an electronic control unit (ECU) according to an embodiment.

The schematic configuration of the engine 1 will be described with reference to FIG. 1. In FIG. 1, the contour of the engine 1 is indicated by imaginary lines.

The engine 1 (an example of an internal combustion engine) is, for example, an in-line four-cylinder gasoline engine. In the engine 1, four cylinders (not illustrated) are provided, and a piston 12 (only one piston is illustrated in FIG. 1) is housed in each cylinder. The piston 12 is coupled to a crankshaft 13 via a connecting rod 12a.

An intake port of each cylinder is connected to an intake passage, and a throttle valve (not illustrated) and so forth are disposed in the intake passage. The throttle valve is provided to adjust the intake air amount. An exhaust port of each cylinder is connected to an exhaust passage, and a three-way catalyst (not illustrated) and so forth are disposed in the exhaust passage.

Further, an intake camshaft 14 configured to drive an intake valve 12b of each cylinder is disposed in an upper portion of the engine 1, and an exhaust camshaft 15 configured to drive an exhaust valve 12c of each cylinder is also disposed in the upper portion of the engine 1. The camshafts 14, 15 are respectively provided with variable valve timing mechanisms 70, 80 configured to vary the rotational phases of the camshafts 14, 15 relative to the crankshaft 13.

Cam sprockets 14b, 15b are respectively attached to the variable valve timing mechanisms 70, 80. A crank sprocket (not illustrated) is attached to the crankshaft 13. A timing chain 3 is looped over the crank sprocket and the cam sprockets 14b, 15b.

A sprocket (not illustrated) configured to drive an oil pump 5 is attached to the crankshaft 13. A pump sprocket 5b is attached to an input shaft 5a of the oil pump 5. A chain 4 is looped over the pump sprocket 5b and the sprocket attached to the crankshaft 13.

With such a configuration, the rotation of the crankshaft 13 is transmitted to the input shaft 5a via the chain 4 and so forth, so that the oil pump 5 is operated. Due to the operation of the oil pump 5, engine oil (hereinafter, simply referred to as "oil") stored in an oil pan 16 disposed in a lower portion of the engine 1 is drawn up via an oil strainer (not illustrated), and is then discharged from the oil pump 5 to a discharge oil passage 6a.

The oil discharged from the oil pump 5 as described above flows into a main gallery 20 of an oil supply system 2 via an oil filter 6. Branch oil passages 21 to 23 are connected to the main gallery 20. The oil is supplied to crank journals 13a from the branch oil passage 21 extending downward from the main gallery 20. Further, the oil is supplied to the variable valve timing mechanisms 70, 80 and so forth from the branch oil passage 22 extending upward from the main gallery 20. Further, the oil is supplied to cam journals 14a, 15a and so forth from the branch oil passage 23 extending upward from the main gallery 20.

Figure 2:
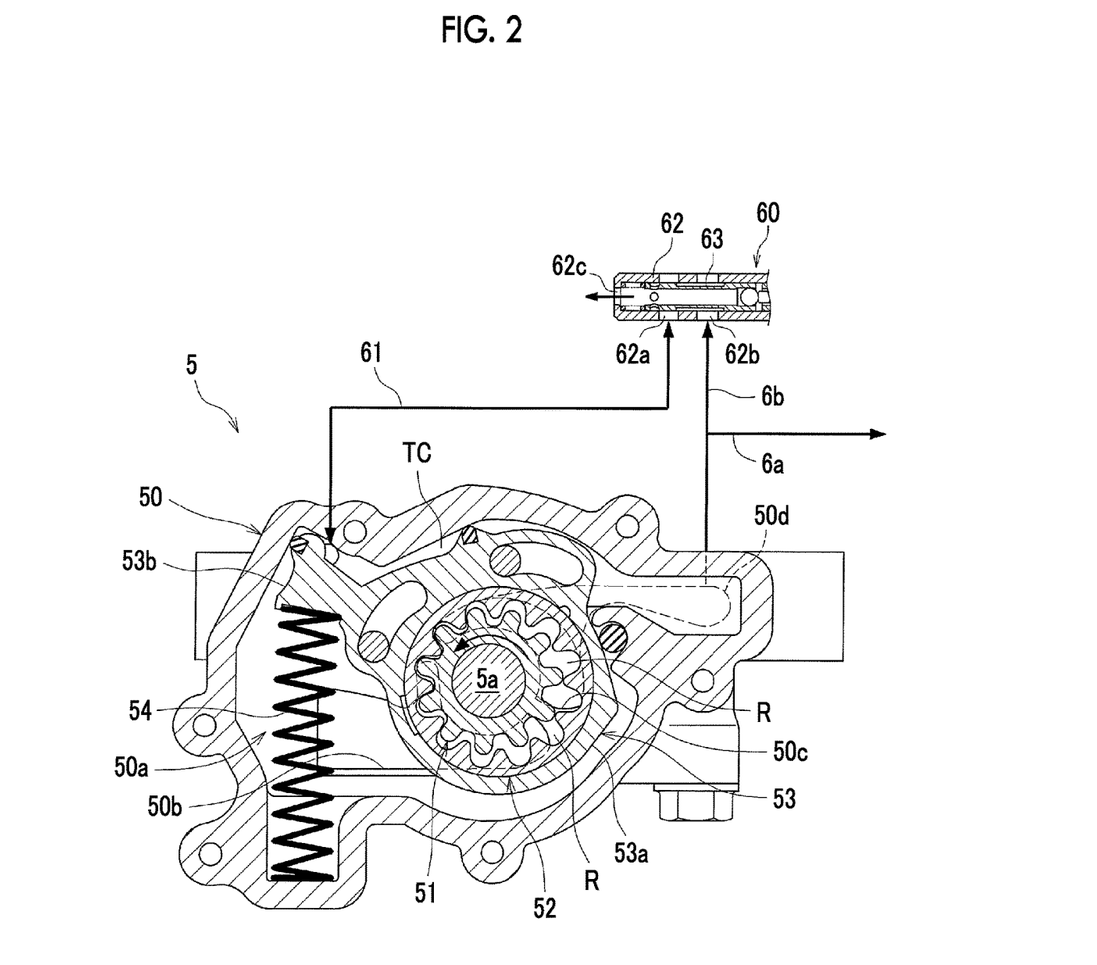
FIG. 2 is a sectional view illustrating the state where the pump capacity of an oil pump of the engine is at the maximum.
Figure 3:
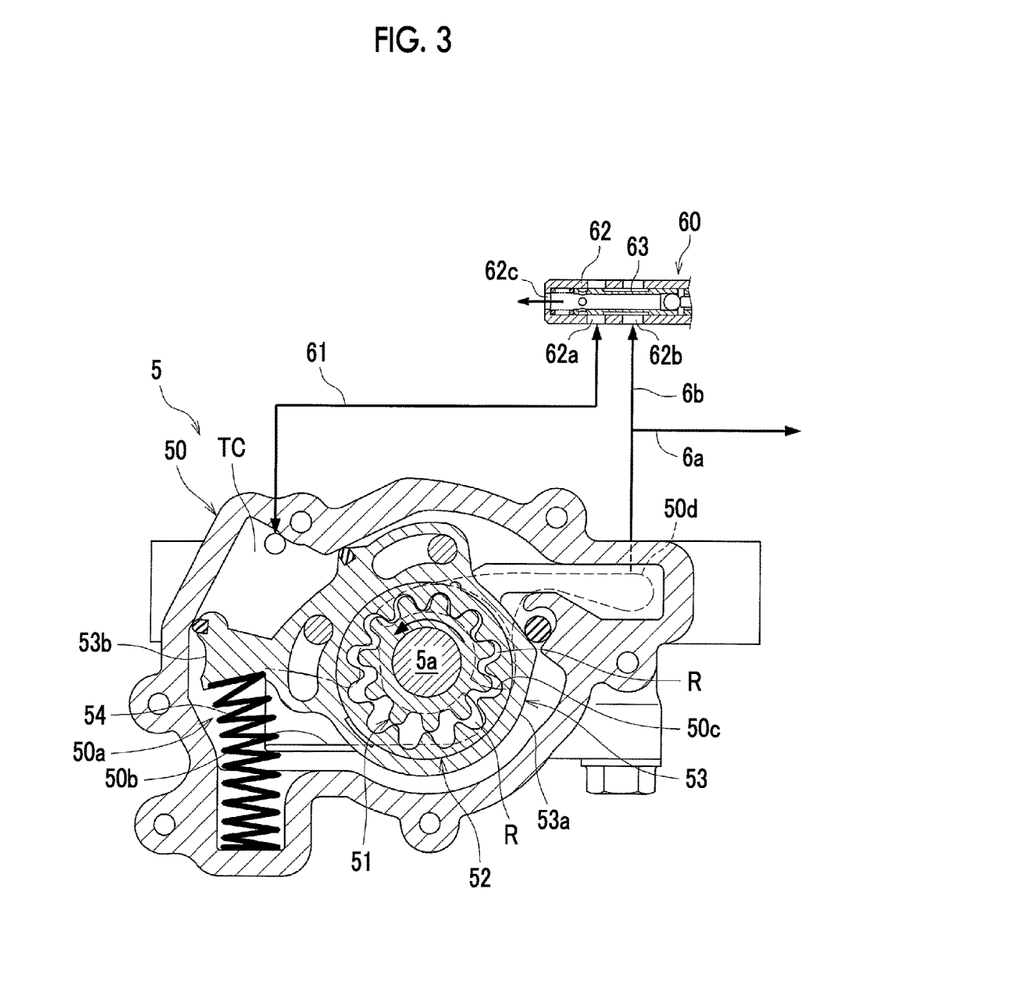
FIG. 3 is a sectional view illustrating the state where the pump capacity of the oil pump of the engine is at the minimum.

Next, the oil pump 5 will be described with reference to FIG. 2 and FIG. 3.

The oil pump 5 is, for example, an internal gear pump. The oil pump 5 includes a drive rotor 51, and a driven rotor 52. The drive rotor 51 is an external gear configured to be rotated by the input shaft 5a. The driven rotor 52 is an internal gear configured to be rotated while being meshed with the drive rotor 51. The outer periphery of the driven rotor 52 is held by an adjustment ring 53. The drive rotor 51, the driven rotor 52, and the adjustment ring 53 are housed in a housing portion 50a of the housing 50. The rotational direction of the input shaft 5a is the counterclockwise direction in FIG. 2.

The center of the driven rotor 52 is offset from the center of the drive rotor 51 by a prescribed amount. The drive rotor 51 and the driven rotor 52 are meshed with each other on the side on which the center of the driven rotor 52 is offset from the center of the drive rotor 51. Further, a plurality of working chambers R is formed in a space between the drive rotor 51 and the driven rotor 52, such that the working chambers R are arranged side by side in the circumferential direction. The volume of each of the working chambers R increases or decreases while the working chambers R move in the circumferential direction in accordance with the rotation of the drive rotor 51 and the driven rotor 52.

The oil is sucked in from a suction port 50b, in a range in which the volume of the working chamber R increases, whereas the oil is delivered to a discharge port 50c while being pressurized, in a range in which the volume of the working chamber R decreases. The suction port 50b communicates with the oil strainer through an oil passage (not illustrated). On the other hand, the discharge port 50c communicates with the discharge oil passage 6a through an oil passage 50d inside the housing 50.

In the oil pump 5, the drive rotor 51 and the driven rotor 52 rotate while being meshed with each other, as the input shaft 5a rotates due to a rotative force of the crankshaft 13. Thus, the oil is sucked from the suction port 50b into working chambers R formed between the drive rotor 51 and the driven rotor 52, and is then discharged from the discharge port 50*c*.

The oil pump 5 includes a variable capacity mechanism configured to vary the discharge amount per rotation of the input shaft 5*a*, that is, the pump capacity. In the variable capacity mechanism, the pump capacity is varied as the adjustment ring 53 is rotated due to a hydraulic pressure in a control space TC formed in the housing portion 50*a* of the housing 50. FIG. 2 illustrates the state where the pump capacity is at the maximum. FIG. 3 illustrates the state where the pump capacity is at the minimum.

The adjustment ring 53 includes a body portion 53*a* and an arm portion 53*b*. The body portion 53*a* has a ring-shape, and is configured to hold the driven rotor 52. The arm portion 53*b* extends outward from the body portion 53*a*. The arm portion 53*b* is biased by a coil spring 54, and the hydraulic pressure in the control space TC acts on the arm portion 53*b*. Specifically, the adjustment ring 53 is biased by the coil spring 54 in a direction opposite to the rotational direction of the input shaft 5*a* (in such a direction that the volume of the control space TC decreases). As the hydraulic pressure in the control space TC increases, the adjustment ring 53 is rotated in the rotational direction of the input shaft 5*a* (in such a direction that the volume of the control space TC increases) against the biasing force of the coil spring 54.

The control space TC is connected to an oil control valve (OCV) 60 through a control oil passage 61. The hydraulic pressure is controlled by the OCV 60. The OCV 60 includes a spool 63 disposed in a sleeve 62, and an electromagnetic driving unit (not illustrated) configured to move the spool 63. The sleeve 62 has a control port 62*a*, a supply port 62*b*, and a discharge port 62*c*. The control port 62*a* is connected to the control space TC through the control oil passage 61. The supply port 62*b* is connected to a supply oil passage 6*b* that branches off from the discharge oil passage 6*a*.

The OCV 60 is configured to be switched, due the movement of the spool 63, between the state where the control port 62*a* communicates with the discharge port 62*c* so that the oil from the control oil passage 61 is discharged, and the state where the control port 62*a* communicates with the supply port 62*b* so that the oil from the oil pump 5 is delivered to the control oil passage 61.

In the oil pump 5, as the adjustment ring 53 is rotated due to the adjustment of the hydraulic pressure in the control space TC by the OCV 60, the positions of the drive rotor 51 and the driven rotor 52 relative to the suction port 50*b* and the discharge port 50*c* are varied, so that the pump capacity is varied.

Figure 4:
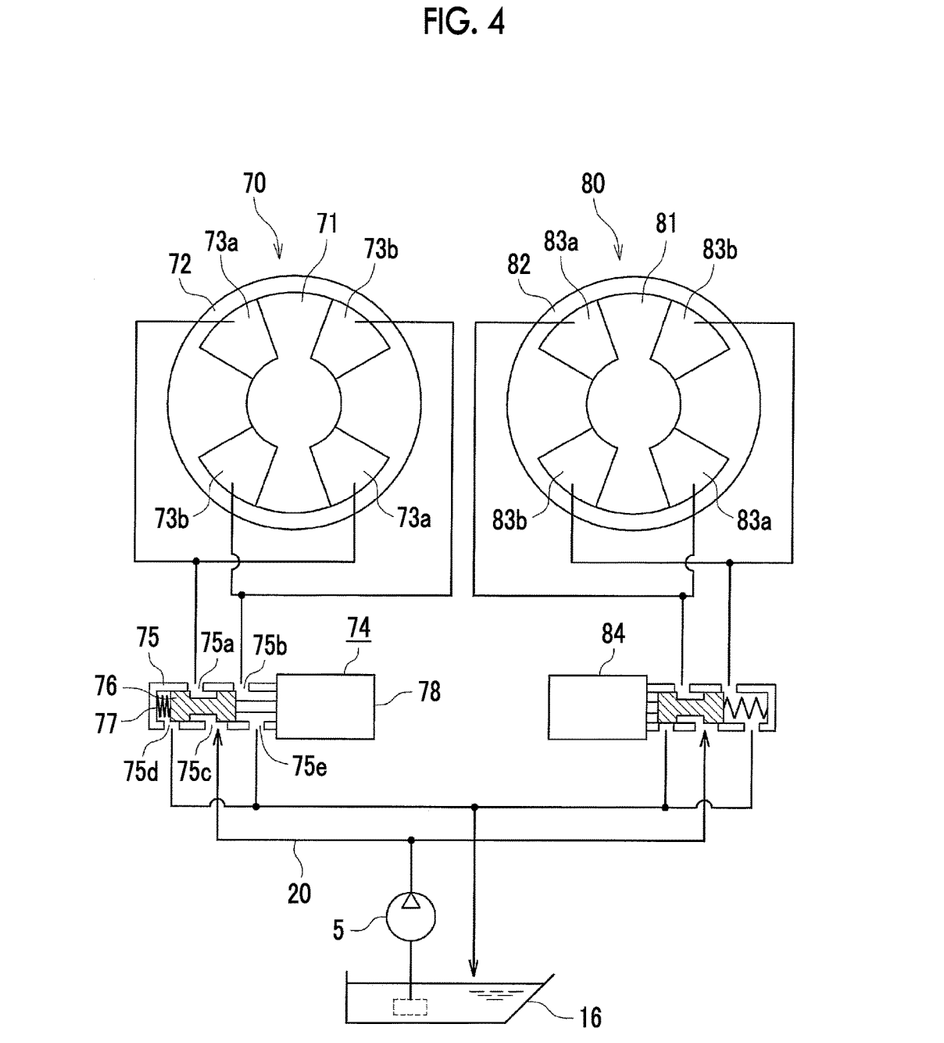
FIG. 4 is a schematic configuration diagram schematically illustrating variable valve timing mechanisms of the engine.

Next, the variable valve timing mechanisms 70, 80 provided in the engine 1 will be described with reference to FIG. 4. The variable valve timing mechanisms 70, 80 are configured to vary the valve timings (valve opening timings) of the intake valve 12*b* and the exhaust valve 12*c* (see FIG. 1) by hydraulically varying the phases of the camshafts 14, 15 (see FIG. 1) relative to the crankshaft 13 (see FIG. 1), respectively.

The variable valve timing mechanism 70 on the intake side includes a vane rotor 71, and a housing 72 in which the vane rotor 71 is accommodated. The vane rotor 71 is coupled to the intake camshaft 14, and the housing 72 is coupled to the cam sprocket 14*b* (see FIG. 1). The vane rotor 71 and the housing 72 are coaxially disposed, and are provided so as to be rotatable relative to each other. Advancing chambers 73*a* and retarding chambers 73*b* that are separated from each other by vanes of the vane rotor 71 are formed in the housing 72.

The variable valve timing mechanism 70 on the intake side is provided with an oil control valve (OCV) 74 configured to adjust the position of the vane rotor 71 relative to the housing 72. The OCV 74 includes a spool 76 configured to move in a sleeve 75, a coil spring 77 configured to bias the spool 76, and an electromagnetic driving unit 78 configured to move the spool 76 against the biasing force of the coil spring 77.

The sleeve 75 has an advancing port 75*a* connected to the advancing chambers 73*a*, a retarding port 75*b* connected to the retarding chambers 73*b*, a supply port 75*c* connected to the oil pump 5 through the main gallery 20, and discharge ports 75*d*, 75*e*. The spool 76 is configured to vary the connection state of each port based on the position of the spool 76 in the sleeve 75.

In the variable valve timing mechanism 70, when the advancing port 75*a* communicates with the supply port 75*c* and the retarding port 75*b* communicates with the discharge port 75*e*, the oil is supplied from the oil pump 5 to the advancing chambers 73*a* through the main gallery 20, and the oil in the retarding chambers 73*b* is drained into the oil pan 16. Thus, the vane rotor 71 is rotated to the advancing side (rotated in the rotational direction of the vane rotor 71) relative to the housing 72. That is, the rotational phase of the intake camshaft 14 relative to the crankshaft 13 is advanced, so that the valve timing of the intake valve 12*b* is advanced.

On the other hand, when the retarding port 75*b* communicates with the supply port 75*c* and the advancing port 75*a* communicates with the discharge port 75*d*, the oil is supplied from the oil pump 5 to the retarding chambers 73*b* through the main gallery 20, and the oil in the advancing chambers 73*a* is drained into the oil pan 16. Thus, the vane rotor 71 is rotated to the retarding side (rotated in the direction opposite to the rotational direction of the vane rotor 71) relative to the housing 72. That is, the rotational phase of the intake camshaft 14 relative to the crankshaft 13 is retarded, so that the valve timing of the intake valve 12*b* is retarded.

When the advancing port 75*a* and the retarding port 75*b* are closed by the spool 76, supply and discharge of the oil to and from the advancing chambers 73*a* and the retarding chambers 73*b* are stopped, so that the position of the vane rotor 71 relative to the housing 72 is kept unchanged.

The variable valve timing mechanism 80 on the exhaust side includes a vane rotor 81, a housing 82 in which the vane rotor 81 is accommodated, advancing chambers 83*a* and retarding chambers 83*b* that are formed in the housing 82, and an oil control valve (OCV) 84 configured to adjust the position of the vane rotor 81 relative to the housing 82. Since the variable valve timing mechanism 80 has substantially the same configuration as that of the variable valve timing mechanism 70, overlapping description will be omitted.

Figure 5:
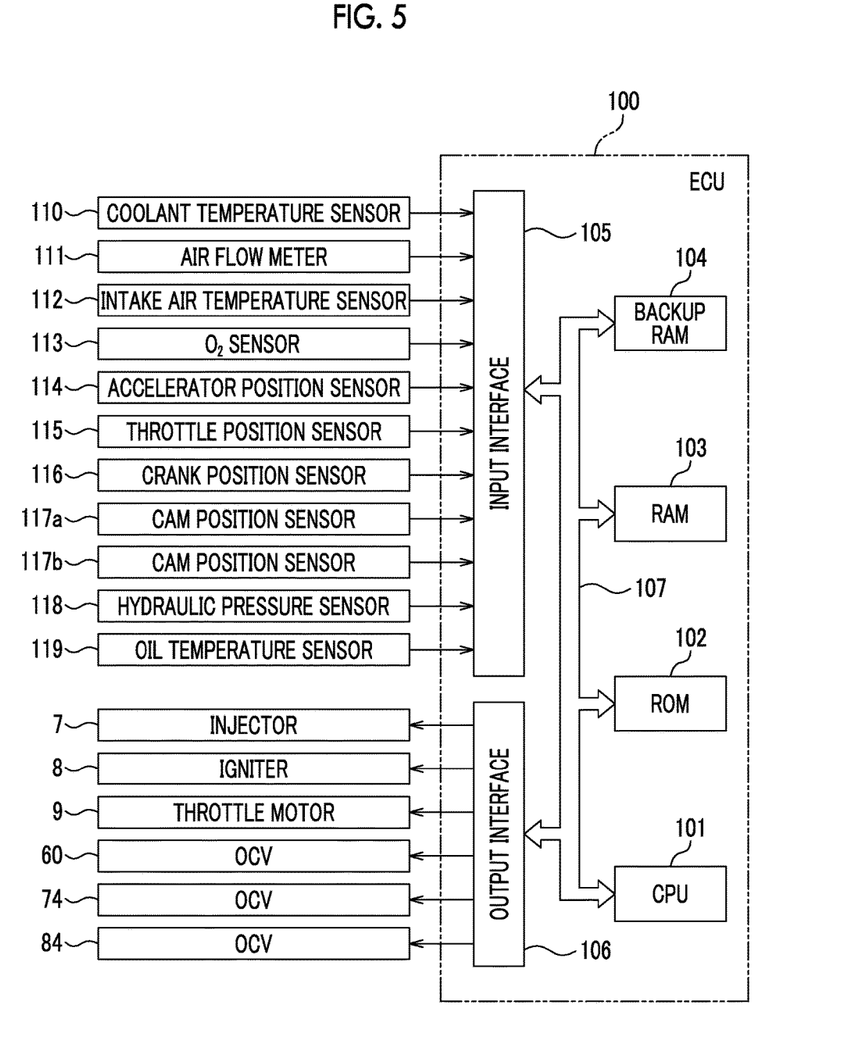
FIG. 5 is a block diagram illustrating the schematic configuration of the ECU configured to control the engine.

Next, the electronic control unit (ECU) 100 configured to control the engine 1 will be described with reference to FIG. 5.

The ECU 100 includes a central processing unit (CPU) 101, a read-only memory (ROM) 102, a random-access memory (RAM) 103, a backup RAM 104, an input interface 105, an output interface 106, and a bus 107 that connects these units to each other. In the ECU 100, various controls are implemented when the CPU 101 executes programs stored in the ROM 102.

The CPU 101 executes calculation processes based on various control programs, maps and so forth stored in the ROM 102. The various control programs, the maps that are referred to when the various control programs are executed, and so forth are stored in the ROM 102. The RAM 103 is a memory that temporarily stores calculation results obtained by the CPU 101, detection results obtained by various sensors, and so forth. The backup RAM 104 is a nonvolatile memory that stores data and so forth to be saved when an ignition is turned off.

Devices connected to the input interface 105 include a coolant temperature sensor 110 configured to detect a coolant temperature of the engine 1, an air flow meter 111 configured to measure an intake air amount, an intake air temperature sensor 112 configured to measure an intake air temperature, an $O^2$ sensor 113 configured to detect an oxygen concentration in the exhaust gas, an accelerator position sensor 114 configured to detect an accelerator operation amount, a throttle position sensor 115 configured to detect an opening degree (throttle opening degree) of the throttle valve, a crank position sensor 116 configured to detect a rotation position of the crankshaft 13, a cam position sensor 117a configured to detect a rotation position of the intake camshaft 14, a cam position sensor 117b configured to detect a rotation position of the exhaust camshaft 15, an hydraulic pressure sensor 118 configured to detect a hydraulic pressure in the main gallery 20, and an oil temperature sensor 119 configured to detect an oil temperature in the main gallery 20. The accelerator operation amount is an example of "accelerator operation amount information".

Devices connected to the output interface 106 include an injector 7 that is a fuel injection device, an igniter 8 configured to supply a high voltage for spark discharge to a spark plug, a throttle motor 9 configured to drive the throttle valve, the OCV 60 of the oil pump 5, the OCV 74 of the variable valve timing mechanism 70 on the intake side, and the OCV 84 of the variable valve timing mechanism 80 on the exhaust side. The ECU 100 is configured to control the operation state of the engine 1 by controlling, for example, the intake air amount, the fuel injection amount, and the ignition timing, based on, for example, detection results obtained by the various sensors.

Further, the ECU 100 is configured to vary the valve timing (valve opening timing) of each of the intake valve 12b and the exhaust valve 12c based on, for example, the operation state of the engine 1. Specifically, the ECU 100 sets target phases of the variable valve timing mechanisms 70, 80 based on the number of rotations per unit time (hereinafter, simply referred to as "rotational speed") and a load factor of the engine 1, and controls the OCV 74 and the OCV 84 so that the deviations between the target phases and the actual phases are eliminated. For example, the target phase of the variable valve timing mechanism 70 is derived from a first map in which the rotational speed and the load factor of the engine 1 are used as parameters, and the target phase of the variable valve timing mechanism 80 is derived from a second map in which the rotational speed and the load factor of the engine 1 are used as parameters. The first map and the second map are maps different from each other. Further, the actual phase of the variable valve timing mechanism 70 is calculated based on the detection results obtained by the crank position sensor 116 and the cam position sensor 117a, and the actual phase of the variable valve timing mechanism 80 is calculated based on the detection results obtained by the crank position sensor 116 and the cam position sensor 117b.

The rotational speed of the engine 1 is calculated based on the detection result obtained by the crank position sensor 116. The load factor is the ratio of the intake air amount in the current operation state to the maximum amount of air to be taken into the engine 1. The load factor is calculated based on, for example, the intake air amount measured by the air flow meter 111 and the rotational speed of the engine 1.

Further, the ECU 100 is configured to control the discharge amount of oil from the oil pump 5, based on, for example, the operation state of the engine 1. Specifically, the ECU 100 sets a target hydraulic pressure of the main gallery 20, and controls the discharge amount of oil from the oil pump 5 such that the deviation between the target hydraulic pressure and the actual hydraulic pressure is eliminated. The discharge amount of oil from the oil pump 5 is controlled as the pump capacity is varied by the OCV 60. Further, the target hydraulic pressure is set based on the hydraulic pressure required by, for example, each of the variable valve timing mechanisms 70, 80 that are hydraulically operated, and the actual hydraulic pressure is detected by the hydraulic pressure sensor 118.

It is possible to enhance the fuel efficiency of the engine 1 by keeping the discharge amount of oil from the oil pump 5 (the power that the oil pump 5 receives from the engine 1) at the minimum necessary. Meanwhile, in order to improve the responsiveness of the operations of the variable valve timing mechanisms 70, 80 that operate using the hydraulic pressure as a power source, it is preferable to achieve a certain degree of hydraulic pressure (a hydraulic pressure higher than that at the time of non-operation) before the start of operations thereof. In view of this, the ECU 100 of the present embodiment is configured to predict the operations of the variable valve timing mechanisms 70, 80, and to increase the target hydraulic pressure of the main gallery 20 before the start of operations of the variable valve timing mechanisms 70, 80.

The variable valve timing mechanisms 70, 80 are configured to operate based on the load factor (intake air amount). Because the intake air varies following (after a time lag from) variation in the accelerator operation amount, the operations of the variable valve timing mechanisms 70, 80 can be predicted by anticipating (making a prediction on) the target intake air amount (future load factor) based on the accelerator operation amount. Note that, increasing the target hydraulic pressure means making the target hydraulic pressure higher than that in the case where the operations of the variable valve timing mechanisms 70, 80 are not predicted and the variable valve timing mechanisms 70, 80 are not operated.

Specifically, the ECU 100 calculates a required engine torque based on the accelerator operation amount, and calculates a target intake air amount (future load factor) for achieving the required engine torque. The required engine torque is an engine torque requested by a driver. The ECU 100 predicts (anticipates) a future target phase of the variable valve timing mechanism 70 based on the rotational speed and the future load factor of the engine 1, and calculates an anticipated deviation that is a difference between the future target phase and the current actual phase. That is, the ECU 100 calculates the future target phase based on the rotational speed of the engine 1 and the required engine torque.

Further, the ECU 100 calculates a current target phase of the variable valve timing mechanism 70 based on the rotational speed and the current load factor of the engine 1, and calculates an actual deviation that is a difference between the current target phase and the current actual phase. The current load factor is calculated by using the intake air amount measured by the air flow meter 111.

Similarly, the ECU 100 predicts (anticipates) a future target phase of the variable valve timing mechanism 80 based on the rotational speed and the future load factor of the engine 1, and calculates an anticipated deviation that is a difference between the future target phase and the current actual phase. Further, the ECU 100 calculates a current target phase of the variable valve timing mechanism 80 based on the rotational speed and the current load factor of the engine 1, and calculates an actual deviation that is a difference between the current target phase and the current actual phase.

The ECU 100 is configured to select the greatest deviation from among the anticipated deviation and the actual deviation in the variable valve timing mechanism 70 on the intake side and the anticipated deviation and the actual deviation in the variable valve timing mechanism 80 on the exhaust side, and to set the target hydraulic pressure of the main gallery 20 based on the selected deviation. The ECU 100 is configured to set the target hydraulic pressure to a higher value as the selected deviation is greater.

Figure 6:
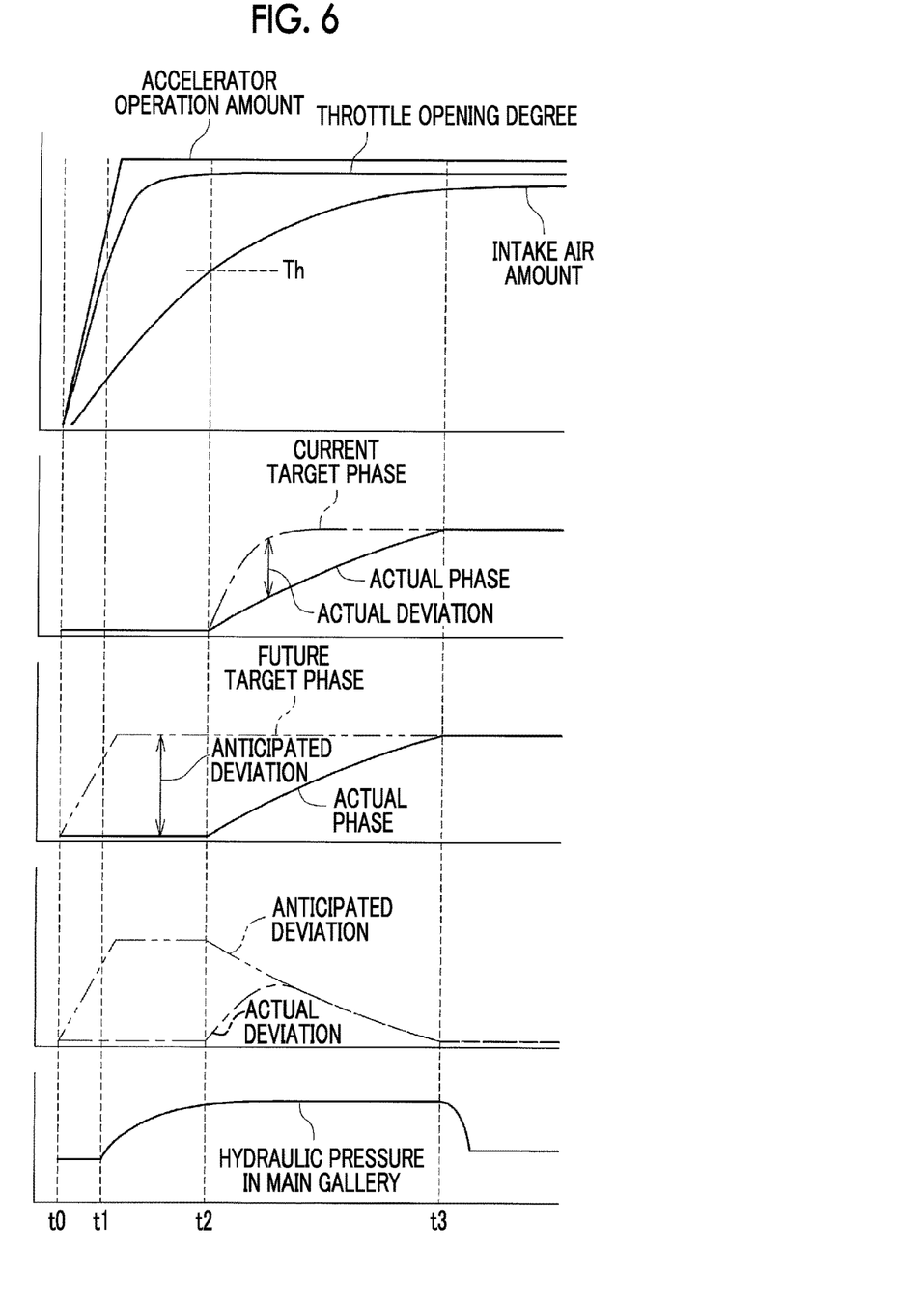
FIG. 6 is a time-series chart illustrating an example of the operation of the variable valve timing mechanism.

Next, an example of the case where the variable valve timing mechanism 70 on the intake side operates will be described with reference to FIG. 6. In this operation example, the variable valve timing mechanism 80 on the exhaust side does not operate, and therefore description of the variable valve timing mechanism 80 on the exhaust side will be omitted.

First, in response to an operation of an accelerator pedal (not illustrated) at time t0, the accelerator operation amount increases, and the throttle opening degree increases with an increase in the accelerator operation amount. The load factor (intake air amount) increases following (after a time lag from) an increase in the throttle opening degree.

Then, the ECU 100 calculates a current target phase based on the rotational speed and the current load factor of the engine 1, and calculates an actual deviation based on the current target phase and the current actual phase. In this example, the current target phase rises from time t2 at which the load factor exceeds a prescribed value Th. Therefore, the actual deviation is zero during a period from time t0 to time t2.

Further, the ECU 100 calculates a required engine torque based on the accelerator operation amount, and calculates a target intake air amount (future load factor) for achieving the required engine torque. The required engine torque is an engine torque requested by the driver. The ECU 100 calculates a future target phase based on the rotational speed and the future load factor of the engine 1, and calculates an anticipated deviation based on the future target phase and the current actual phase. In this example, the future target phase rises from time t0 in accordance with a variation (increase) in the accelerator operation amount, so that an anticipated deviation is generated from time t0.

Then, the ECU 100 selects the greater of the anticipated deviation and the actual deviation, and sets the target hydraulic pressure of the main gallery 20 based on the selected deviation. Thus, the target hydraulic pressure of the main gallery 20 becomes greater than a base value from time t0, and the hydraulic pressure in the main gallery 20 rises from time t1. That is, the hydraulic pressure in the main gallery 20 can be increased in advance before time t2 at which the actual deviation is generated and the operation of the variable valve timing mechanism 70 is started. Note that, the base value of the target hydraulic pressure is, for example, the target hydraulic pressure when the anticipated deviation and the actual deviation are zero.

Then, at time t2, the actual deviation is generated in response to rising of the current target phase, so that the variable valve timing mechanism 70 is operated so as to eliminate the actual deviation. That is, the variable valve timing mechanism 70 is operated to the advancing side such that the actual phase follows the current target phase.

When the actual phase converges to the current target phase at time t3, the operation of the variable valve timing mechanism 70 ends. At this time, the anticipated deviation and the actual deviation become zero, and the target hydraulic pressure of the main gallery 20 returns to the base value. Thus, the hydraulic pressure in the main gallery 20 returns to its original value.

Figure 7:
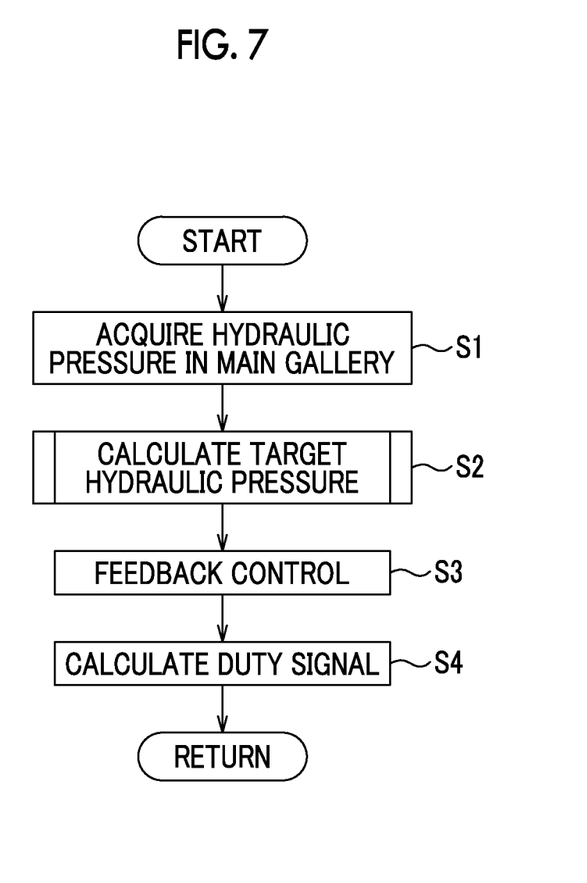
FIG. 7 is a flowchart illustrating an example of the flow of control of the oil pump, which is executed by the ECU.

Next, the flow of control of the oil pump 5, which is executed by the ECU 100, will be described with reference to FIG. 7. The following control flow is repeatedly executed by the ECU 100 at prescribed time intervals.

First, a hydraulic pressure in the main gallery 20 is acquired in step S1. This hydraulic pressure is an actual hydraulic pressure in the main gallery 20, which is detected by the hydraulic pressure sensor 118.

Next, a target hydraulic pressure of the main gallery 20 is calculated in step S2. The calculation of the target hydraulic pressure will be described later in detail.

Next, in step S3, a discharge amount required of the oil pump 5 is calculated by executing feedback control based on the target hydraulic pressure and the actual hydraulic pressure.

Then, in step S4, the OCV 60 is controlled such that the oil pump 5 outputs the required discharge amount of oil. That is, a duty signal for achieving a pump capacity at which the required discharge amount of oil is output is calculated, and is supplied to the OCV 60. Then, the process is returned.

Figure 8:
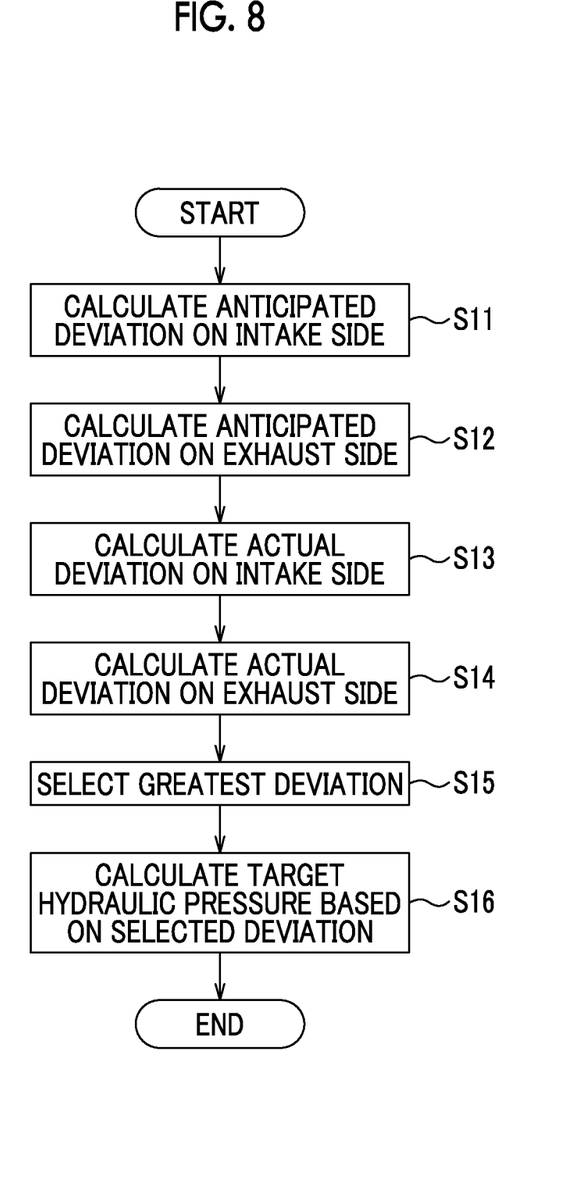
FIG. 8 is a flowchart illustrating calculation of a target hydraulic pressure in step S2 in FIG. 7.

Next, the calculation of the target hydraulic pressure in step S2 will be described in detail with reference to FIG. 8.

First, in step S11, an anticipated deviation in the variable valve timing mechanism 70 on the intake side is calculated. Specifically, a required engine torque is calculated based on the accelerator operation amount, and a target intake air amount (future load factor) for achieving the required engine torque is calculated. A future target phase of the variable valve timing mechanism 70 is calculated based on the rotational speed and the future load factor of the engine 1, and the anticipated deviation is calculated based on the future target phase and the current actual phase. The actual phase of the variable valve timing mechanism 70 is calculated based on the detection results obtained by the crank position sensor 116 and the cam position sensor 117*a*.

Then, in step S12, an anticipated deviation in the variable valve timing mechanism 80 on the exhaust side is calculated. Specifically, a required engine torque is calculated based on the accelerator operation amount, and a target intake air amount (future load factor) for achieving the required engine torque is calculated. A future target phase of the variable valve timing mechanism 80 is calculated based on the rotational speed and the future load factor of the engine 1, and the anticipated deviation is calculated based on the future target phase and the current actual phase. The actual phase of the variable valve timing mechanism 80 is calculated based on the detection results obtained by the crank position sensor 116 and the cam position sensor 117*b*.

Then, in step S13, an actual deviation in the variable valve timing mechanism 70 on the intake side is calculated. Specifically, a current target phase of the variable valve timing mechanism 70 is calculated based on the rotational speed and the current load factor of the engine 1, and an actual deviation is calculated based on the current target phase and the current actual phase.

Then, in step S14, an actual deviation in the variable valve timing mechanism 80 on the exhaust side is calculated.

Specifically, a current target phase of the variable valve timing mechanism 80 is calculated based on the rotational speed and the current load factor of the engine 1, and the actual deviation is calculated based on the current target phase and the current actual phase.

Then, in step S15, the greatest deviation is selected from among the four deviations, that is, the anticipated deviation in the variable valve timing mechanism 70 on the intake side, the actual deviation in the variable valve timing mechanism 70 on the intake side, the anticipated deviation in the variable valve timing mechanism 80 on the exhaust side, and the actual deviation in the variable valve timing mechanism 80 on the exhaust side.

Then, in step S16, the target hydraulic pressure of the main gallery 20 is calculated based on the selected deviation. The target hydraulic pressure is set to a higher value as the value of the deviation is greater. Note that, increasing the target hydraulic pressure means making the target hydraulic pressure higher than the base value that is the target hydraulic pressure when the deviation is zero. Then, the process ends.

In the present embodiment, the target intake air amount (future load factor) is calculated based on the required engine torque, the anticipated deviation is calculated by using the future load factor, and the target hydraulic pressure of the main gallery 20 is set based on the anticipated deviation, as described above. The discharge amount of oil from the oil pump 5 is controlled such that the actual hydraulic pressure in the main gallery 20 becomes the target hydraulic pressure. With this configuration, the operations of the variable valve timing mechanisms 70, 80 are predicted using the future load factors calculated based on the required engine torque, and the target hydraulic pressure of the main gallery 20 is increased before the operations of the variable valve timing mechanisms 70, 80 are started, so that it is possible to increase the hydraulic pressures to be supplied to the OCV 74 and the OCV 84 at appropriate timing immediately before the operations of the variable valve timing mechanisms 70, 80 are started. Thus, it is possible to ensure the high responsiveness of the operations of the variable valve timing mechanisms 70, 80 from immediately after the start of operations thereof. Thus, it is possible to improve the responsiveness of the variable valve timing mechanisms 70, 80 while enhancing the fuel efficiency.

Further, in the present embodiment, the target hydraulic pressure is set to a higher value as the deviation is greater. Thus, the amount of increase in the hydraulic pressure can be made small when the deviation is small, whereas the amount of increase in the hydraulic pressure can be made large when the deviation is great. As a result, it is possible to prevent the hydraulic pressure from increasing more than necessary. Thus, it is possible to enhance the fuel efficiency.

Further, in the present embodiment, the greatest deviation is selected from among the anticipated deviations and the actual deviations in the variable valve timing mechanisms 70, 80, and the target hydraulic pressure is set based on the selected deviation. As a result, it is possible to ensure the target hydraulic pressure until the actual phase converges to the current target phase (until the actual deviation becomes zero), even when the anticipated deviation becomes smaller than the actual deviation, for example, in a case where sudden depression and release of the accelerator pedal are repeated or in a case where a follow-up delay occurs in the variable valve timing mechanisms 70, 80.

The disclosed embodiment is to be considered in all respects as illustrative and not restrictive. The technical scope of the disclosure is defined by claims, and is not defined only by the foregoing embodiment. Further, all changes which come within the meaning and range of equivalency of the claims are therefore intended to be embraced therein.

For example, in the foregoing embodiment, the variable valve timing mechanism 70 on the intake side and the variable valve timing mechanism 80 on the exhaust side are provided. However, the disclosure not limited to this configuration, and a variable valve timing mechanism may be provided only one of the intake side and the exhaust side.

Further, in the foregoing embodiment, the actual phase of the variable valve timing mechanism 70 is calculated based on the detection results obtained by the crank position sensor 116 and the cam position sensor 117*a*. However, the disclosure is not limited to this configuration, and an estimated value may be used as the actual phase. For example, a smoothed value obtained by executing a smoothing process on the target phase may be used as an actual phase. The same applies to the actual phase of the variable valve timing mechanism 80.

Further, in the foregoing embodiment, the valve timing is variable. However, the disclosure is not limited to this configuration, and a lift amount may be variable, in addition to the valve timing.

Further, in the foregoing embodiment, the engine 1 is an in-line four-cylinder gasoline engine. However, the disclosure not limited to this configuration, and the engine 1 may be any engine in which the intake air amount can be adjusted by a throttle valve. The number of cylinders of the engine is not limited to any particular number, and any type of engine (a V-type engine or a horizontally opposed engine) may be employed.

Further, in the foregoing embodiment, the oil pump 5 of which the capacity is varied based on the hydraulic pressure in the control space TC is employed. However, the disclosure not limited to this configuration, and any pump, such as an electric oil pump, may be employed as long as the discharge amount can be varied.

Further, in the foregoing embodiment, the greatest deviation is selected from among the anticipated deviation and the actual deviation on the intake side and the anticipated deviation and the actual deviation on the exhaust side, and the target hydraulic pressure is calculated based on the selected deviation. However, the disclosure not limited to this configuration, and the target hydraulic pressures corresponding to the respective deviations may be calculated, and the greatest target hydraulic pressure may be selected from among the target hydraulic pressures.

Further, in the foregoing embodiment, the target hydraulic pressure is calculated after the actual hydraulic pressure is acquired. However, the disclosure not limited to this configuration, and the actual hydraulic pressure may be acquired after the target hydraulic pressure is calculated. That is, the flowcharts in FIG. 7 and FIG. 8 are illustrative, and the disclosure is not limited to the procedure illustrated in FIG. 7 and FIG. 8.

Further, in the foregoing embodiment, the target phase of the variable valve timing mechanism 70 is derived from the first map, and the target phase of the variable valve timing mechanism 80 is derived from the second map. However, the disclosure not limited to this configuration, and one of the first map and the second map need not be provided when there is a third map for deriving a target overlap period using the rotational speed and the load factor of the engine 1 as parameters. For example, when there is no second map, the target phase of the variable valve timing mechanism 80 can be calculated from the target phase (a map value of the first map) of the variable valve timing mechanism 70 and a target overlap period (a map value of the third map).

The disclosure can be applied to a control device for an internal combustion engine, which is configured to control an internal combustion engine including an oil pump configured to vary a discharge amount of oil, and a variable valve timing mechanism configured to be operated by the oil supplied from the oil pump.

What is claimed is:

1. A control device for an internal combustion engine, the internal combustion engine including an oil pump, a crankshaft, a camshaft, and a variable valve timing mechanism, the oil pump being configured to vary a discharge amount of oil, and the variable valve timing mechanism being configured to vary a phase of the camshaft relative to the crankshaft using the oil supplied from the oil pump, such that a valve timing is varied, the control device comprising:

an electronic control unit configured to:

calculate a required engine torque based on accelerator operation amount information;

calculate a future target phase of the variable valve timing mechanism based on a rotational speed of the internal combustion engine and the required engine torque;

calculate an anticipated deviation that is a difference between the future target phase and a current actual phase; and control the discharge amount of oil from the oil pump based on the anticipated deviation.

2. The control device according to claim 1, wherein the electronic control unit is configured to increase the discharge amount of oil as the anticipated deviation is greater.

3. The control device according to claim 1, wherein the electronic control unit is configured to:

calculate a current target phase based on the rotational speed and a load factor of the internal combustion engine;

calculate an actual deviation that is a difference between the current target phase and the current actual phase; and control the discharge amount of oil from the oil pump based on the greater of the anticipated deviation and the actual deviation.

4. A method of controlling an internal combustion engine controlled by an electronic control unit, the internal combustion engine including an oil pump, a crankshaft, a camshaft, and a variable valve timing mechanism, the oil pump being configured to vary a discharge amount of oil, and the variable valve timing mechanism being configured to vary a phase of the camshaft relative to the crankshaft using the oil supplied from the oil pump, such that a valve timing is varied, the method comprising:

calculating, by the electronic control unit, a required engine torque based on accelerator operation amount information;

calculating, by the electronic control unit, a future target phase of the variable valve timing mechanism based on a rotational speed of the internal combustion engine and the required engine torque;

calculating, by the electronic control unit, an anticipated deviation that is a difference between the future target phase and a current actual phase; and controlling, by the electronic control unit, the discharge amount of oil from the oil pump based on the anticipated deviation.

* * * * *